United States Patent [19]

Lee et al.

[11] 4,096,060

[45] Jun. 20, 1978

[54] METHOD UTILIZING PLUG FLOW FOR SEPARATING SOLIDS FROM LIQUID

[75] Inventors: Charles A. Lee; Frederick M. Granberg, both of Knoxville, Tenn.

[73] Assignee: Fairchild Incorporated, Beckley, W. Va.

[21] Appl. No.: 506,120

[22] Filed: Sep. 16, 1974

[51] Int. Cl.² .......................................... B01D 31/00
[52] U.S. Cl. .................................. 210/23 R; 210/65
[58] Field of Search .................... 210/22, 23, 65, 321

[56] References Cited

U.S. PATENT DOCUMENTS

| | | | |
|---|---|---|---|
| 3,536,611 | 10/1970 | Filippi et al. | 210/22 |
| 3,558,481 | 1/1971 | Furgerson | 210/22 |
| 3,630,378 | 12/1971 | Bauman | 210/257 |
| 3,722,694 | 3/1973 | Agranat | 210/321 |
| 3,758,405 | 9/1973 | Fremont | 210/321 |
| 3,786,924 | 1/1974 | Huffman | 210/321 |
| 3,827,565 | 8/1974 | Matsumura | 210/22 |

OTHER PUBLICATIONS

Journal, Filtration & Separation, Nov./Dec. 1971, pp. 715–718.
Lamb, Sir Horace, Hydrodynamics, Dover Publications, New York, N.Y., 1879–1932.

*Primary Examiner*—Theodore A. Granger
*Attorney, Agent, or Firm*—Fitch, Even, Tabin & Luedeka

[57] ABSTRACT

A method utilizing the phenomenon of plug flow for removing solids from liquid. Liquid with suspended solids, such as paper mill effluent, is passed through a conduit under conditions of plug flow. This produces a moving plug containing the suspended particles, with the liquid along the wall of the conduit being relatively free of suspended particles. The wall is made liquid permeable, and liquid is forced through the wall as the liquid moves along the conduit. Preferably the wall is made relatively impermeable to a substantial portion of the suspended solids to assure that relatively pure liquid flows through the wall, leaving the solids concentrated in the remaining liquid flowing through the conduit. Liquid with concentrated solids is recirculated.

3 Claims, 5 Drawing Figures

METHOD UTILIZING PLUG FLOW FOR SEPARATING SOLIDS FROM LIQUID

This invention relates to the separation of solids from liquid and more particularly to such removal utilizing the phenomenon of plug flow. The invention relates to the purification of water and more particularly to the removal of particulate material from paper mill effluent, cannery waste, sewage and the like containing fibrous materials.

In order to preserve and improve the purity of our rivers, streams, lakes and other waters, it is desirable that various pollutants be removed from industrial waste water before the water is disposed of. Further, in many industrial processes, it is desirable that various processing materials be reclaimed from the waste water. The removal of pollutants is now a legal requirement. The Federal Water Pollution Control Act requires that all industries operating in the United States and discharging waste effluents into a body of water utilize the best practicable technology to clean the used water. The Act further requires that by July 1, 1983, the best available technology be used. Zero discharge of pollutants into a water body is the goal to be attained by 1985. Proposed guide lines for the paperboard from waste paper segment of the pulp, paper and paperboard industry include a limit on total suspended solids of 3.0 pounds per ton of manufactured product using the best practicable technology, and 1.2 pounds per ton using the best available technology. Previously available technology does not appear capable of meeting the latter requirement.

Various filtration, ultrafiltration and reverse osmosis processes and systems have been successfully utilized in purifying waste water or reclaiming processing materials therefrom. A substantial difficulty with such prior art filter processes has been in respect to the fouling of the system with particulate matter. It has been common to stop the processing from time to time and back-flush the filter media to wash off the filter cake which has accumulated. It is also known to flow a substantial part of the unfiltered liquid over the filter media to scour the filter cake therefrom. Effective filtering necessarily presents conflicting requirements since a higher throughput deposits more filter cake which then limits the throughput; on the other hand, with a filter cake the filtration is often not effective.

In accordance with the present invention, the phenomenon of plug flow is utilized to preclude the building up of filter cake in the first place since relatively few suspended particles are permitted to strike the filter media. The invention has particular application to so-called ultrafiltration processes and systems.

Plug flow is a natural phenomenon found in the flow of liquid containing suspended particulate matter. It is particularly evident in the flow of suspended fibrous material through a conduit at certain Reynolds numbers. Plug flow is a condition between laminar and turbulent flow, characterized by the movement of a core or plug of the suspension substantially as a unit, the plug region tending to accumulate the particulate matter and its boundaries being spaced some distance from the wall of the constraining conduit. The space between the boundaries of the plug and the conduit wall is relatively free of suspended particles and flows in substantially laminar flow along the surface of the conduit.

Plug flow exists over a range of fluid velocities depending upon the particular liquid and the particulate matter suspended therein. At relatively low velocities, the flow is laminar. At higher velocities the flow assumes the plug flow condition. At still higher velocities the flow becomes turbulent. There is a range over which the plug flow degenerates to turbulent flow with the core progressively degenerating and turbulence arising between the plug and the boundary layer of particle-free liquid along the conduit surface.

Plug flow is not a single critical condition, rather it occurs over a range of flow rates. It may occur with a Reynolds number between 300 and 15,000. The condition of plug flow is, however, readily observable. It can, for example, be visually observed in the flow of transparent liquid containing particulate matter through a transparent tube. It may also be observed from the results achieved upon application of the present invention. For the purposes of the present invention, plug flow is taken as including flow through a conduit where there is a moving plug preferentially including suspended solids and a region along the wall of the conduit relatively free of suspended solids, whether or not there is turbulence between the plug and the region along the wall. Certain characteristics of plug flow are described in the "Hydrodynamic Behaviour of Paper-Making Fibres" by Forgacs, Robertson and Mason, *Pulp and Paper Magazine of Canada*, May, 1958.

In accordance with the present invention, liquid containing particulate matter is passed through a conduit under conditions of plug flow, and liquid is withdrawn from the suspended, substantially particle-free region at such rate as not to destroy the suspended, substantially particle-free nature of the region. As the liquid is withdrawn, the suspended particulate matter further concentrates in the plug, leaving additional suspended, substantially particle-free liquid in the boundary region, whereupon further liquid may be withdrawn. In the preferred embodiment of the present invention, the liquid is withdrawn relatively uniformly along the conduit at such rate that the boundary region remains at a relatively constant thickness.

Filtration utilizing plug flow may be achieved with a filtration medium such as a fine screen. However, the invention finds particular application in ultrafiltration wherein the filter medium has pores so fine as to stop very fine particles.

It is therefore the primary object of the invention to separate particulate matter from liquid, utilizing the phenomenon of plug flow. Other objects and advantages of the invention will become evident from consideration of the following detailed description particularly when taken in conjunction with the accompanying drawings in which.

Figure 1:
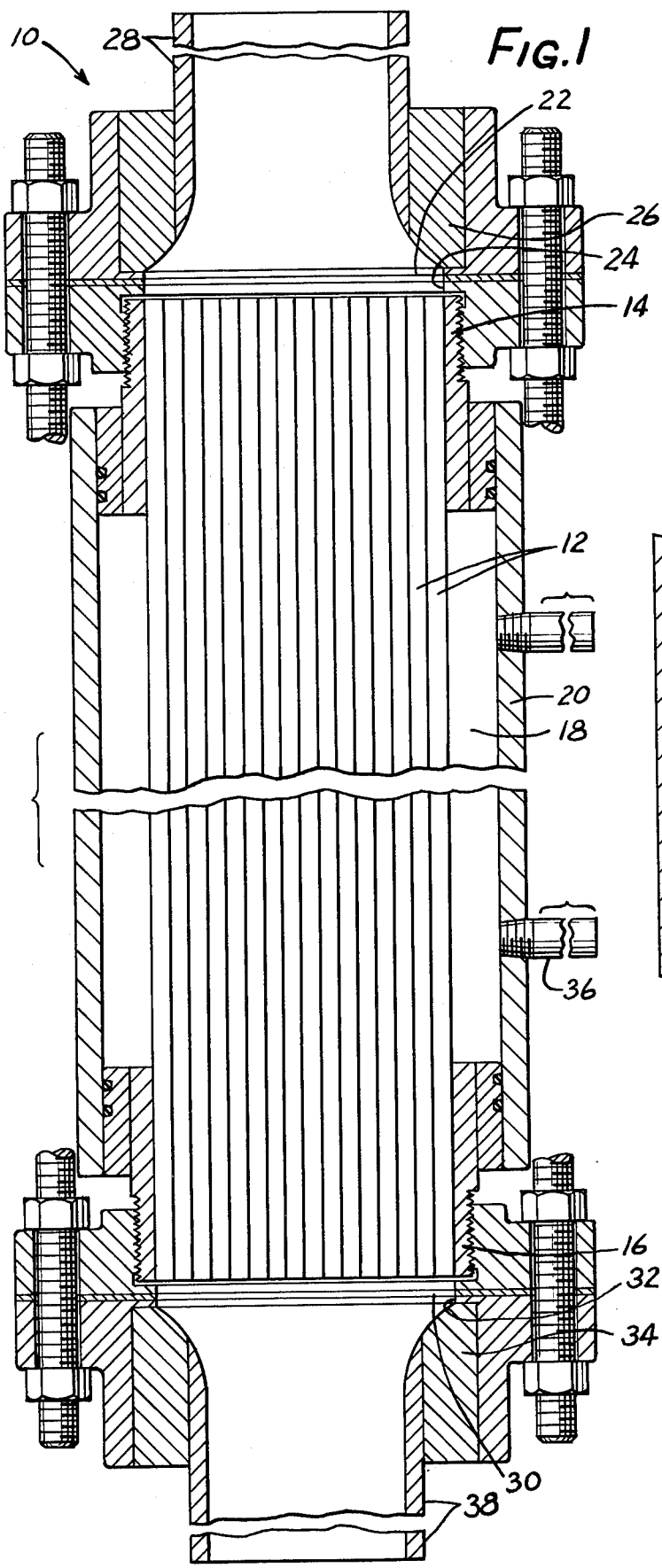
FIG. 1 is a vertical view, partly in section, of a filter bank used in a preferred embodiment of the present invention.

A preferred form of ultrafiltration banks utilized in the present invention is shown in FIG. 1. A filter bank 10 is formed of a plurality of circularly cylindrical filter tubes 12. Respective ends of the filter tubes 12 are sealed into bulkheads 14 and 16. The tubes are disposed adjacent one another in a chamber 18 formed by a cylindrical wall 20 closed by the bulkheads 14 and 16. The wall 20 may be sealed to the bulkheads 14 and 16, as by O-rings, when placed in position around the tubes 12 to form the chamber 18. A header 22 is formed by a wall 24, the bulkhead 14 and an end wall 26. An inlet pipe 28 extends through the end wall 26 into the header 22. An outlet chamber 30 is formed by a wall 32, the bulkhead 16 and an end wall 34. An outlet pipe 38 extends from the outlet chamber through the end wall 34. A permeate outlet pipe 36 extends from the chamber 18 through the wall 20.

Figure 2:
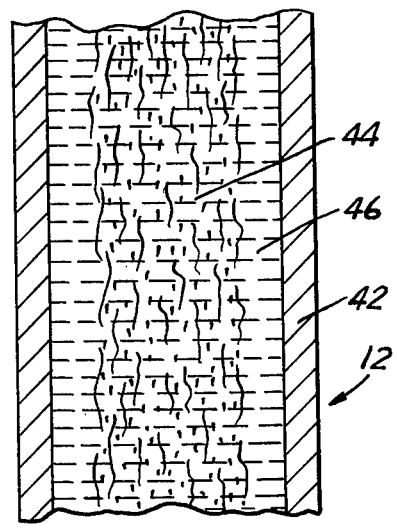
FIG. 2 is an enlarged sectional view of part of a filter tube utilized in the filter bank shown in FIG. 1.

Each of the filter tubes 12 may be formed as illustrated in FIG. 2 in vertical section. As shown, each filter tube 12 has a porous wall 42. The tube 12 is permeable to the liquid it is desired to purify but is preferably made relatively impermeable to the solids it is desired to remove.

Liquid from which solids are to be separated is supplied under pressure through the inlet pipe 28 to the header 22. The header 22 distributes the liquid to the respective filter tubes 12. Liquid, with the contained solids, flows through the filter tubes 12 to the chamber 30 and thence out the outlet pipe 38. Back pressure is provided in the outlet pipe 38 so that the liquid is under pressure in the filter tubes 12. The chamber 18 is under a lesser pressure, such as atmospheric pressure. Hence, there is a driving force across the walls 42, driving the liquid, such as water, through the walls 42 together with dissolved solids as may pass through the pores of the walls 42. This permeate is then removed from the chamber 18 through the permeate outlet pipe 36.

In accordance with the present invention, the liquid is caused to flow through the tubes 12 under condition of plug flow. Under these conditions, a central core or plug 44 is formed in the flow in each tube. The plug 44 is formed by a loose matrix of particulate matter suspended in the liquid. The plug 44 is surrounded by an annulus 46 that is relatively clear and substantially free of suspended particles. The flow in the annulus 46 seems to provide a certain microturbulence along the inner surface of the wall 42 tending to lift any matter closing the pores of the wall 42. Under conditions of plug flow substantially no suspended particles reach the surface of wall 42, and even dissolved solids under certain conditions may accumulate in the plug 44, as by associating with the suspended particles.

Plug flow is created by driving water into the header 22 at a suitable rate. Plug flow is then produced automatically. As the liquid with the suspended matter flows through the tubes at the appropriate rate, plug flow is produced naturally, in accordance with hydrodynamic principles. It takes a certain distance along the tubes 12 before plug flow is established from the turbulent flow in the header 22. If desired, the walls 42 may be made impervious to the point where plug flow can be reasonably assured to be established. At the same time, the carrier liquid, such as water from the boundary layer of the plug, is forced through the walls 42 under the pressure sustained by the back pressure applied from the outlet pipe 38. The criteria for determining the flow rates, pressures and permeability of the members are interrelated. The faster the liquid is made to flow through the tubes 12, the thicker the clear annulus 46, until the plug flow begins to deteriorate. However, it requires greater power to drive the liquid faster. The greater the back pressure, the more liquid that can be forced through the walls 42. However, if the pressure is too great for the porosity of the wall 42, the boundary layer will be forced through the wall faster than it can be reestablished, and the wall may burst. Further, it is desirable that the clear liquid from the annulus 46 not be driven through the wall 42 so fast as to disrupt the annulus 46 and the plug 44 with turbulence. Thus, the permeability of the wall 42, the pressure in the tube 12 and the rate of flow through the tube 12 are adjusted in such manner as to produce the optimum rate of removal of the clear liquid through the wall 42 while maintaining conditions of plug flow without the expenditure of excessive energy. This will vary depending upon the character of the particulate matter and its concentration.

Figure 3:
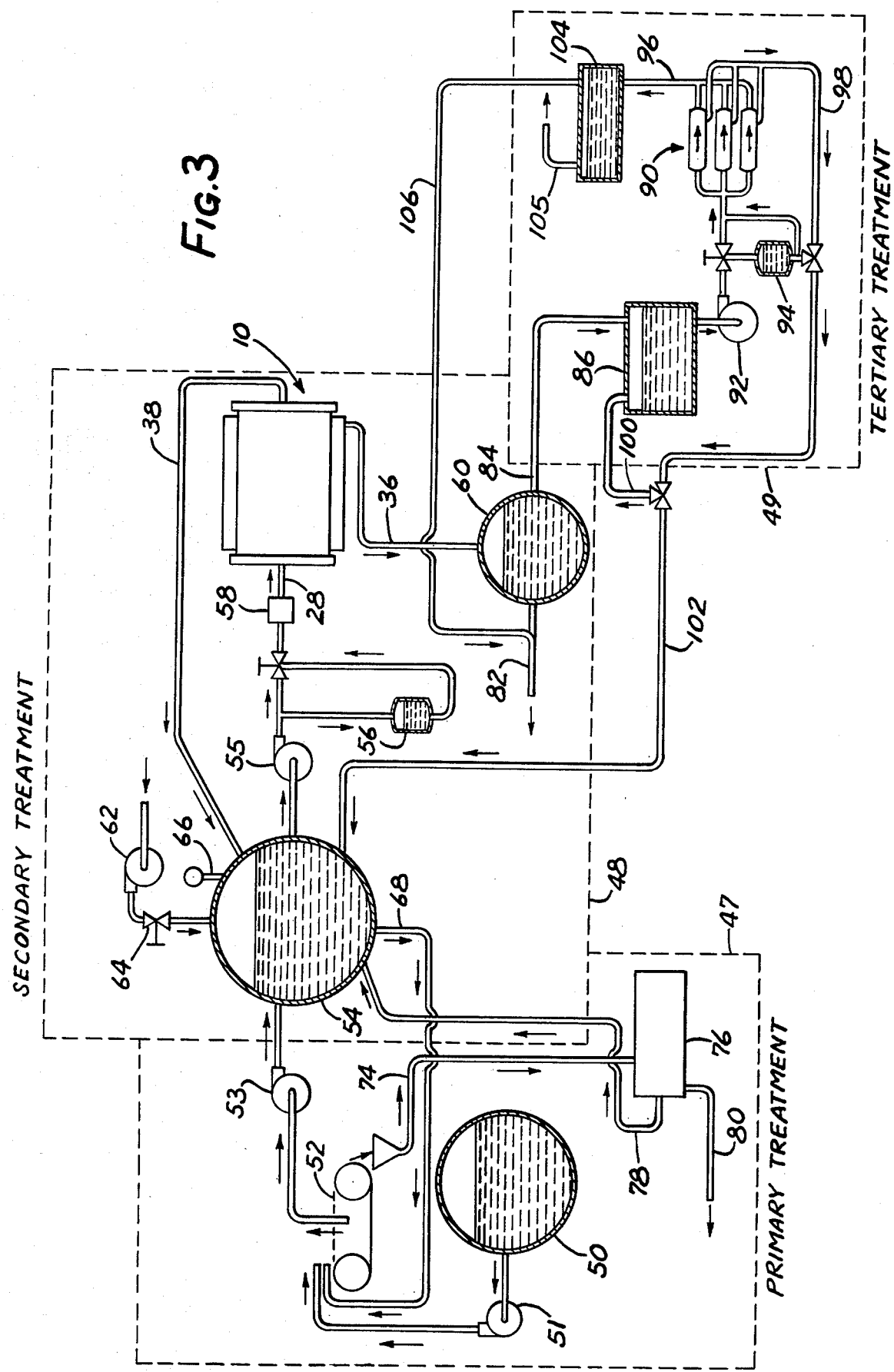
FIG. 3 is a diagrammatic illustration of a preferred system for removing solids from liquid utilizing the present invention, and including a filter bank as shown in FIG. 1.

In FIG. 3 is shown a preferred form of a system utilizing the ultrafiltration bank 10 shown in FIG. 1 as part of a system for removing solids from a liquid, more particularly, for removing solids from paper mill effluent. The system may be in three parts: (1) primary treatment apparatus 47 which may be relatively conventional filtering apparatus for removing, compacting and disposing of settleable solids; (2) secondary treatment apparatus 48 including the filter banks 10 for reducing the suspended and colloidal solids; and (3) tertiary treatment apparatus 49 which may be a reverse osmosis apparatus for reducing other contaminants such as dissolved solids providing color or odor.

In the primary treatment apparatus 47, the effluent from a source 50, such as a paper mill, is pumped by a pump 51 to a filter 52. The filter 52 may, as shown, comprise a belt filter which removes much of the suspended and settleable solids from the liquid in a conventional manner. The filtrate from the filter 52 is pumped by a pump 53 into a pressurized concentration tank or vat 54 in the secondary treatment apparatus 48. In the tank or vat 54 the liquid may be treated, as by chemicals, to precipitate certain dissolved solids or to coagulate suspended solids. The liquid with suspended and dissolved solids is then pumped from the tank 54 by a pump 55 into the inlet pipe 28 of the filter bank 10. If desired, rather than pumping the liquid directly into the inlet pipe 28, the pump 55 may pump the liquid into a pressure tank 56 having an appropriate air pad to maintain pressure when the pump 55 is turned off from time to time. This permits the pump to operate intermittently rather than continuously.

A flow regulator 58 may control the rate of flow of liquid into the inlet pipe 28. This flow rate is adjusted to such rate as will produce the desired plug flow in the filter bank 10. The desired flow rate may be determined empirically.

The permeate exiting through the permeate outlet pipe 36 passes to a permeate collection tank 60. Depending upon the starting materials, the permeate may at this point be suitable for reuse in the processing plant, such as a paper mill, or it may be disposed of in the streams. Otherwise, it may require additional purification.

The liquids passing through the tubes 12 is carried through the outlet pipe 38 to the pressurized tank 54 which maintains the back pressure on the liquid in the outlet pipe 38, as desired for driving the liquid through the walls 42. A compressor 62 and a pressure regulator valve 64 maintains the proper back pressure, as may be indicated on a gauge 66.

The liquid returning to the tank 54 has a higher solids content than the liquid pumped out by the pump 55. Consequently, the contents of the tank 54 become more and more concentrated unless and until solids are taken out of the system. The system may operate on a batch basis or a continuous basis. If on a batch basis, the contents of the tank 54 may be concentrated until some predetermined level of concentration is reached, as may be sensed visually or by examination of withdrawn samples. At such time, or periodically, all or part of the contents may be dumped as through a pipe 68 to the filter 52 of the primary treatment apparatus 47. Where the solids become concentrated at the bottom of the tank 54, the system may operate on a continuous basis with the concentrated material being continuously removed through the dump pipe 68. If there is froth or other light solids floating on the liquid in the tank 54, such solids may be removed from the top of the tank in the usual manner.

The concentrated material dumped through the dump pipe 68 is further concentrated by the filter 52. The filtrate from the filter 52 is then recirculated to the tank 54. The filter cake, which may have a solids content of about 10% by weight, may be conveyed by a conveyor 74 for disposal, as to a solids compactor 76 which may press further liquid from the solids. Such liquid may be returned to the tank 54 through a pipe 78, provided it does not contain such contaminants as would require other disposal such as evaporation and disposal of the solid residue. The solids from the compactor 76, which may have a solids content of 50%, may be removed as by a conveyor 80 for conventional solids disposal, as by burning or for landfill or reclaiming and reuse, as may be required or made desirable by the nature of the material.

Returning to the permeate received in the permeate collection tank 60, such as may be reused or is in condition for disposal may be removed through a pipe 82. Alternatively, or at the same time, the permeate may be passed through a pipe 84 to the tertiary treatment apparatus 49, more particularly to a holding tank 86 for a reverse osmosis system. The reverse osmosis system may comprise a plurality of reverse osmosis membrane units 90 and a pump 92 for driving the filtrate through the reverse osmosis system. The reverse osmosis system may include an air pad 94 operating to maintain the pressure in the permeate applied to the membrane units in the event the pump 92 is operated intermittently. The reverse osmosis membrane units operate in a conventional manner to produce relatively pure liquid in an outlet pipe 96 while leaving solids preferentially concentrated in liquid leaving the units in a pipe 98. the concentrated liquid in the pipe 98 may be recirculated to the holding tank 86 through a return pipe 100, if the operation is on a batch basis, or it may be removed intermittently or continuously through a pipe 102 for disposal. As shown, such disposal may be to the tank 54.

The purified water from the outlet pipe 96 may be directed to a storage tank 104, whence it may be used for any general purpose, such as in boilers, through a pipe 105. Alternatively, the purified water may be conducted through a pipe 106 to the pipe 82 to dilute the permeate from the collection tank 60 to make it suitable for use.

Particular flow rates, pressures, pore sizes, permeabilities and other parameters particularly useful in the systems and processes of the present invention depend in large measure on the particular materials to be processed and the uses to which the separated materials are to be put. In certain instances, it may be necessary or desirable that the concentration of dissolved solids not be permitted to build up.

SPECIFIC EXAMPLE

As an example of the efficacy of the system and process in a particular application, parameters used with a raw effluent from a de-ink plant will be given and results described. In a de-ink plant miscellaneous waste papers are recycled to recover the fibers. In the process the printing inks, the fillers such as clay, starches and glue are removed from the fibers. Chemicals such as bleach and caustic may be used in the processing. The raw effluent from a de-ink plant typically contains as suspended solids particles of insoluble inks and fillers, as well as fibrous fines. In this example, the effluent contained 3625 mg./l. of suspended solids suspended in water, a substantial portion of the suspended solids being fibrous. This was processed on a batch basis with the apparatus illustrated in FIG. 3 using a single filter bank 10. The filter bank 10 comprised 14 filter tubes 12 made of high density polyethylene and had a relatively uniform porosity, with the mean diameters of the pores in the range of 3 to 5 microns. The pores were not necessarily round. Each tube had an inner diameter of 6 millimeters and an outer diameter of 8 millimeters. Each tube was about 47 inches long. The filtration pressure was approximately 15 psi. A flow rate in the respective filter tubes 12 of approximately 6.0 ft./sec. produced plug flow. Permeate was removed at the rate of approximately 35 gallons per day per square foot. The permeate was then tested and found to contain approximately 69 mg./l. of suspended solids.

With most liquids containing substantial amounts of organic material, plug flow is readily established. However, under extreme conditions appropriate solids, such as fibers, may be added to permit plug flow to be achieved easily. The plug flow, once established, will be maintained without the need for continuous addition of such material. The fact that the concentrated solids are recycled assures the maintenance of plug flow conditions once established.

Other modifications of the system and process may be made within the scope of the present invention.

What is claimed is:

1. A method for removing suspended solids from liquid containing suspended solids and dissolved solids capable of flowing in a condition of plug flow comprising passing liquid with such solids therein through a conduit at a velocity producing conditions of plug flow in the conduit, whereby suspended solids preferentially accumulate in a moving plug spaced from a wall of the conduit with the liquid along said wall being relatively free of suspended solids, said wall being permeable to said liquid and at least a substantial portion of solids dissolved therein, successively removing part of the liquid with solids dissolved therein through the wall of the conduit along respective successive portions of the conduit relatively disposed in the direction of the flow of liquid through said conduit, the rate of removal of said liquid being such that the plug is maintained spaced from said wall with the liquid along the wall being relatively free of suspended solids, and recirculating to said conduit, for further separation of solids and liquid, liquid with solids suspended therein that has already passed through said conduit.

2. The method according to claim 1 wherein a substantial portion of said suspended solids comprise fiber particles.

3. The method of claim 1 wherein the walls of the conduit are relatively impermeable to at least some of the suspended solids.

* * * * *